United States Patent
Gokavi et al.

(10) Patent No.: US 12,060,900 B2
(45) Date of Patent: Aug. 13, 2024

(54) MULTI-COMPONENT CLAMP

(71) Applicant: Illinois Tool Works Inc., Glenview, IL (US)

(72) Inventors: Mahantesh Gokavi, Pune (IN); Satish Jadhav, Pune (IN)

(73) Assignee: Illinois Tool Works Inc., Glenview, IL (US)

( * ) Notice: Subject to any disclaimer, the term of this patent is extended or adjusted under 35 U.S.C. 154(b) by 159 days.

(21) Appl. No.: 17/183,970

(22) Filed: Feb. 24, 2021

(65) Prior Publication Data

US 2021/0262497 A1     Aug. 26, 2021

(30) Foreign Application Priority Data

Feb. 26, 2020    (IN) .............................. 202021008186

(51) Int. Cl.
*F16B 2/06*      (2006.01)

(52) U.S. Cl.
CPC ..................................... *F16B 2/06* (2013.01)

(58) Field of Classification Search
CPC ......... Y10T 403/7129; Y10T 403/7141; Y10T 403/7171; Y10T 403/7176; F16B 2/06; F16B 2/245; H02G 3/22; H02G 3/32; H02G 3/00; H02G 3/02; H02G 3/0406; H02G 3/24; H02G 3/26; H01R 13/5812; H01R 13/5804; H01R 13/5837
See application file for complete search history.

(56) References Cited

U.S. PATENT DOCUMENTS

| | | | | |
|---|---|---|---|---|
| 2,166,916 A | * | 7/1939 | Lombard | F16B 5/0685 248/222.12 |
| 5,460,342 A | * | 10/1995 | Dore | F16L 3/223 248/68.1 |
| 5,535,969 A | * | 7/1996 | Duffy, Jr. | F16L 3/237 248/68.1 |
| 5,820,048 A | * | 10/1998 | Shereyk | F16L 3/1215 248/74.1 |
| 5,947,426 A | * | 9/1999 | Kraus | F16L 3/1203 248/74.1 |

(Continued)

FOREIGN PATENT DOCUMENTS

| | | | | |
|---|---|---|---|---|
| FR | 2827363 A1 | * | 1/2003 | ............ B60K 15/01 |
| KR | 20160150581 A | * | 12/2016 | ................ F16B 2/06 |

OTHER PUBLICATIONS

Peugeot Citroen Automobiles, Multi-purpose Clip E.g. For Securing Motor Vehicle Fuel And Brake Lines And Cables Has Temporary And Permanent Fastenings, 2003, Translation of FR 2827363 A1 (Year: 2003).*

*Primary Examiner* — Amber R Anderson
*Assistant Examiner* — Zachary A Hall
(74) *Attorney, Agent, or Firm* — Quarles & Brady LLP

(57) ABSTRACT

The present subject matter relates to a multi-component clamp. The multi-component clamp includes a body, where the body includes lateral walls, a top wall and a bottom wall. The multi-component clamp has two or more flexible holders. The flexible holder includes a receptacle. The receptacle has two ends, a first end and a second end. The first end of the receptacle is attached to the body of the multi-component clamp. The second end of the receptacle is kept free for providing flexibility to accommodate components of various sizes.

18 Claims, 6 Drawing Sheets

(56) References Cited

U.S. PATENT DOCUMENTS

| | | | | |
|---|---|---|---|---|
| 6,290,201 B1* | 9/2001 | Kanie | ........................ | F16L 3/20 |
| | | | | 248/68.1 |
| 7,201,352 B2* | 4/2007 | Kawai | ................... | F16L 3/1075 |
| | | | | 248/68.1 |
| 7,658,350 B2* | 2/2010 | Bauer | ..................... | F16L 3/223 |
| | | | | 248/65 |
| 9,270,100 B2* | 2/2016 | Kuhm | ..................... | F16L 3/085 |
| 2012/0128410 A1* | 5/2012 | Naoi | .................... | F16B 21/073 |
| | | | | 403/291 |

* cited by examiner

MULTI-COMPONENT CLAMP

CROSS REFERENCE TO RELATED APPLICATIONS

This application is based on, claims priority to, and incorporates herein by reference in its entirety Indian Patent Application No. 202021008186, filed on Feb. 26, 2020, and entitled "MULTI-COMPONENT CLAMP".

BACKGROUND

A clamp is a type of fastening device used to hold or secure objects. Multi-component clamps, as the name suggests, are types of clamps used for securing multiple components, such as wires and brake lines. Generally, a multi-component clamp includes holders, each having a receptacle that is configured to receive and hold the component that is to be secured.

BRIEF DESCRIPTION OF DRAWINGS

The detailed description is provided with reference to the accompanying figures. It should be noted that the description and the figures are merely examples of the present subject matter and are not meant to represent the subject matter itself.

Figure 1A:
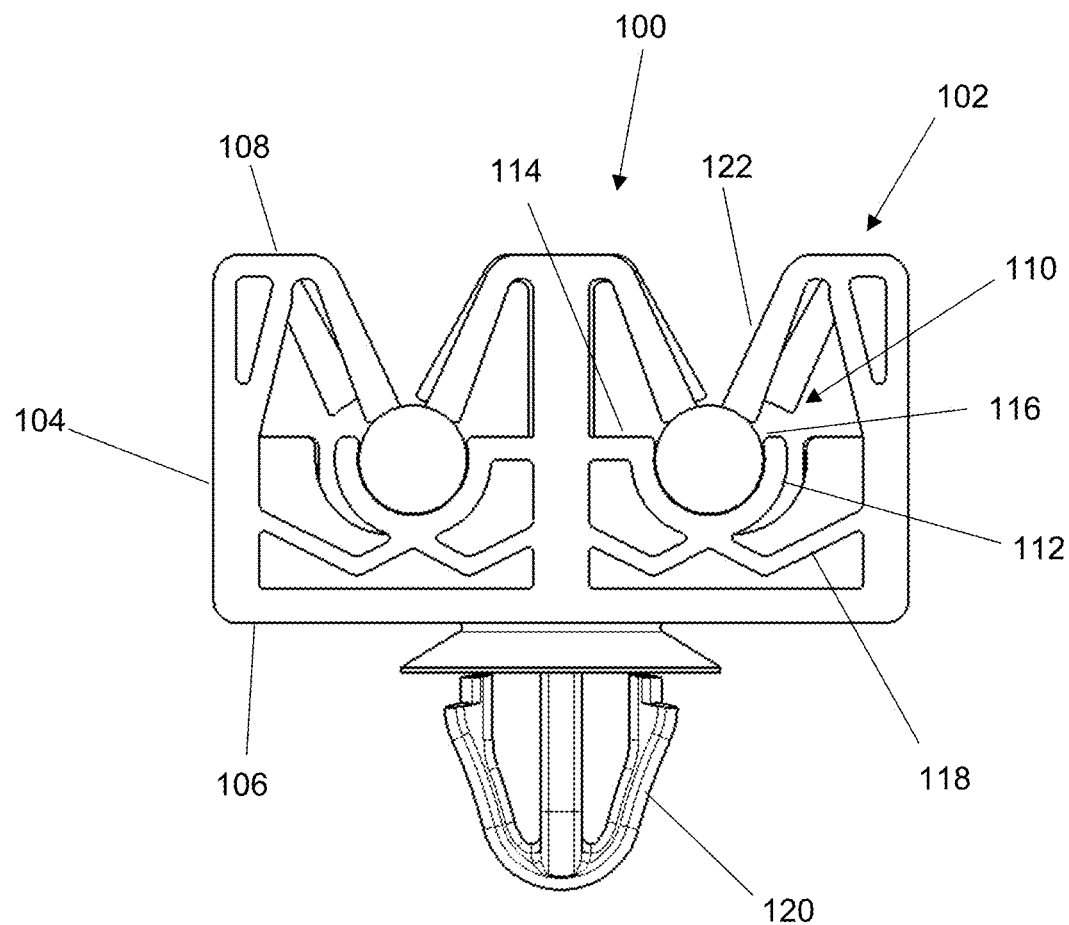
FIG. 1A illustrates a perspective view of a multi-component clamp, in accordance with one example of the present subject matter.

Throughout the drawings, identical reference numbers designate similar elements, but may not designate identical elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Multi-component clamps are, usually, used for holding together a plurality of components and find multiple applications. For instance, in case of a vehicular application, multi-component clamps may be used in the wiring harness for securing multiple wires of the electrical circuitry or for securing multiple brake lines of the brake fluid circuit in a braking system of the vehicle. In all such applications, the shape and size of the components to be held are usually similar. In the above example, the brake lines or the wires have the same shapes and sizes. Certain multi-component clamps may be designed to hold differently sized components. In such cases, each receptacle of the multi-component clamp can be designed for a specifically shaped and sized component. For instance, the one receptacle can be designed for clamping a wire of a large diameter and another receptacle can be designed for clamping the wire of a smaller diameter, and one receptacle cannot be used instead of the other. In other words, the receptacles are, generally, designed with due consideration of the component that is to be clamped therein. If the receptacle is used for another, differently sized component, the multi-component clamp may be incapable of adequately accommodating the component. Either the holding force may be inadequate, for instance, in case of a component smaller than the receptacle, or the insertion forces and/or extraction forces may not be appropriate. For example, the insertion forces for inserting the component in the receptacle and/or the extraction forces for removing the component from the receptacle may be disproportionately high leading to inadequate performance of the multi-component clamp during assembly. In some cases, the structure of the multi-component may even be damaged due while insertion or removal of the components, due to the mismatch. In certain other cases, a thrust force required to slide different components in the receptacle may not be adequate and may either be too high or too low leading to greater amount of wear and tear of the component as well as of the multi-component clamp, sometimes even resulting in damage to either or both.

Examples of a multi-component clamp are described herein. The multi-component clamp has a body and one or more flexible holders. Each flexible holder has a receptacle configured to receive or accommodate a component, such as a cable or a pipe. According to an aspect, the multi-component clamp can accommodate multiple components of different sizes in the same receptacle. In other words, the receptacle of the multi-component is configured to be able to accommodate components of different sizes and, at the same time, is able to meet various fitment or assembly requirements, such as insertion force, extraction force, and thrust force. In addition, the multi-component clamp can have an anchor clamp which can be used to couple the multi-component clamp to a mother component, such as an underside of the body of the vehicle or the dashboard etc.

According to one example, the multi-component clamp can include a body and a flexible holder which has the receptacle. The body has lateral walls, a bottom wall, and a top wall, and the flexible holder is supported by the body. According to an aspect, the receptacle of the flexible holder can be, as an example, formed to have a groove shape, and can have a first end and a second end. The first end of the receptacle is attached to the body to obtain the support therefrom, for instance, to be able to hold the components. On the other hand, the second end of the receptacle is free such that it is flexible for adapting it to accommodate components of various sizes. The connection of the receptacle at one end to the body, for instance, at the lateral wall of the body, provides sufficient holding strength to the receptacle, whereas the cantilevered second end provides it the ability to flex. For instance, the receptacle, formed in a substantially C-shape, has one end of the "C" coupled to the body and the other end being able to flex to change the distance between the two ends of the receptacle, thereby allowing differently sized components to be accommodated therein.

In addition, such a design of the receptacle causes the insertion force required to insert a component into the flexible holder to be significantly low. Furthermore, the receptacle is so designed that a sliding force required to move different components is in an appropriate range, considering the design and materials of the multi-component clamp, such that the components can move slightly which prevents damage to the components as well as to the receptacle. At the same time, the sliding force is not so low that the components can inadvertently slide in the receptacle which can otherwise cause damage to the components. In one example, the flexible holder can be designed such that a thrust force of about 5 Newtons is required to slide a component in the receptacle.

Further, according to an example, a portion between the first end and second end of the receptacle can be supported by a floating member. In an example, the floating member can be coupled between the two lateral walls of the body and can flex along its length, while a bottom part of the receptacle is connected to and supported by the floating member. Such a design, i.e., the flex of the receptacle combined with the flex of the supporting floating member can further aid the design of the multi-component clamp in regulating the insertion force requirement as well as the strength of the multi-component clamp. Therefore, when a component is being inserted in the receptacle, the floating member allows a balanced movement of the receptacle in the direction of the insertion of the component while also providing sufficient reaction force. Accordingly, the floating member can regulate the insertion force required to insert components in the receptacle, such that its neither uncomfortably high nor inadequately low.

In addition to the flexible holder, the multi-component clamp can include a fixed holder adjacent to the flexible holder and can, in an example, work in conjunction with the flexible holder for holding components. Therefore, for each flexible holder, the multi-component clamp can include a fixed holder. The fixed holder includes a fixed receptacle having two ends which are both attached to the body of the multi-component clamp, thereby causing the fixed holder to have a lesser flexibility than the flexible holder. According to an aspect, the provision of the fixed holder can further assist in regulating the insertion force, the extraction force, as well as the thrust force of the multi-component clamp so that the forces are in the appropriate operational range.

In an example, the flexible holder can be designed in a manner that a component of a diameter of at least about 4.76 millimeters and at most of about 6.35 millimeters can be accommodated in the receptacle. Further, in the flexible holder designed to accommodate the aforementioned sizes of the components, the flexible holder can be designed to have an insertion force of about less than 70 Newtons for inserting the components. Further, in the flexible holder designed to accommodate the aforementioned sizes of the components, the flexible holder can be designed to have a separation force for extracting a component from the multi-component claim of around 200 Newtons.

Further, the multi-component clamp includes one or more flexible holder retainers and one or more fixed holder retainers. The flexible holder retainer can be coupled to the body of the multi-component clamp and is provided adjacent to the flexible holder. In a similar manner, the fixed holder retainer can be coupled to the body of the multi-component clamp and is provided adjacent to the fixed holder. The flexible holder retainer and the fixed holder retainer hold the component in the respective receptacles in a secure manner. Therefore, the flexible and fixed holder retainers also enhance the performance of the multi-component clamp in making it difficult for the components to be inadvertently detached from the multi-component clamp.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

Figure 1B:
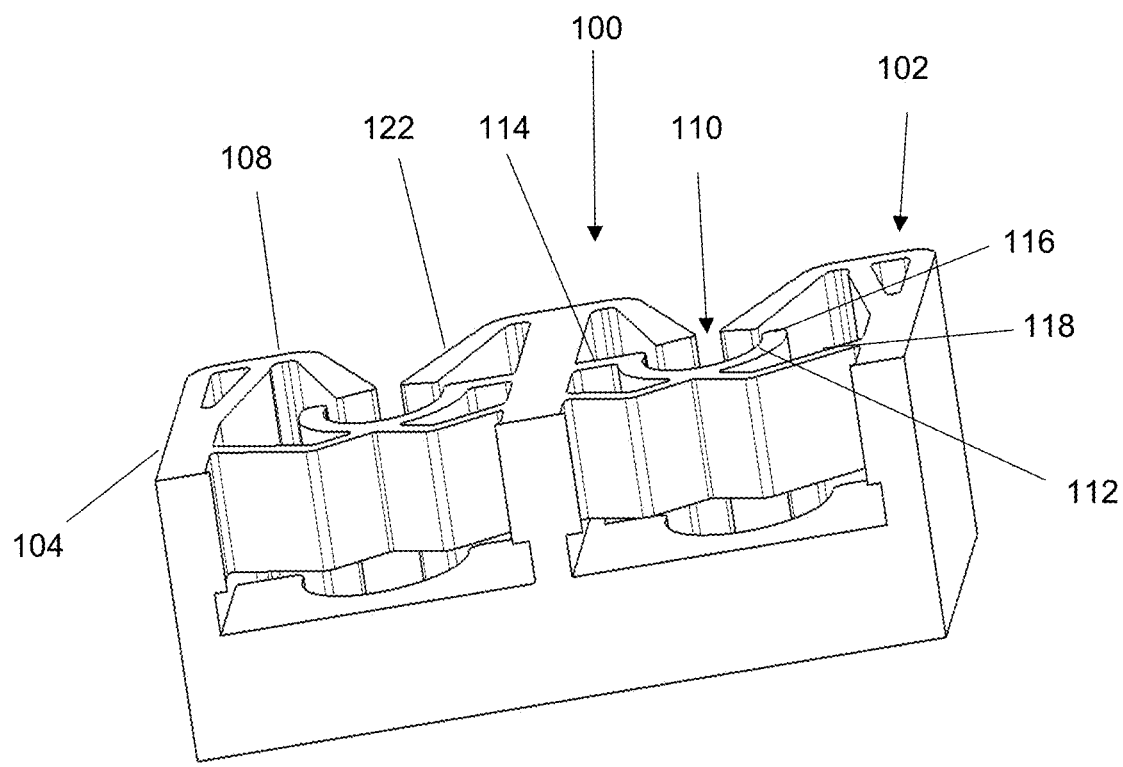
FIG. 1B illustrates a cross-section view of a multi-component clamp, in accordance with an example of the present subject matter.
Figure 1C:
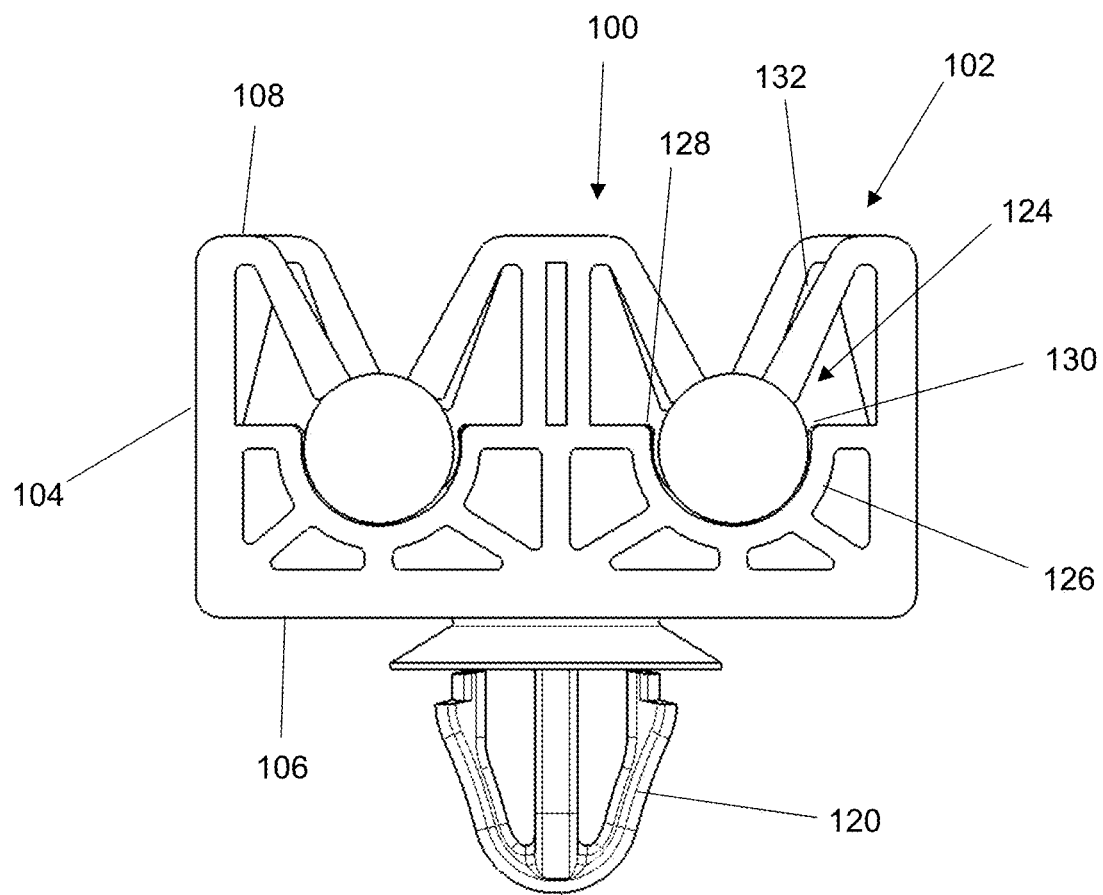
FIG. 1C illustrates a back view of a multi-component clamp, in accordance with an example of the present subject matter.
Figure 1D:
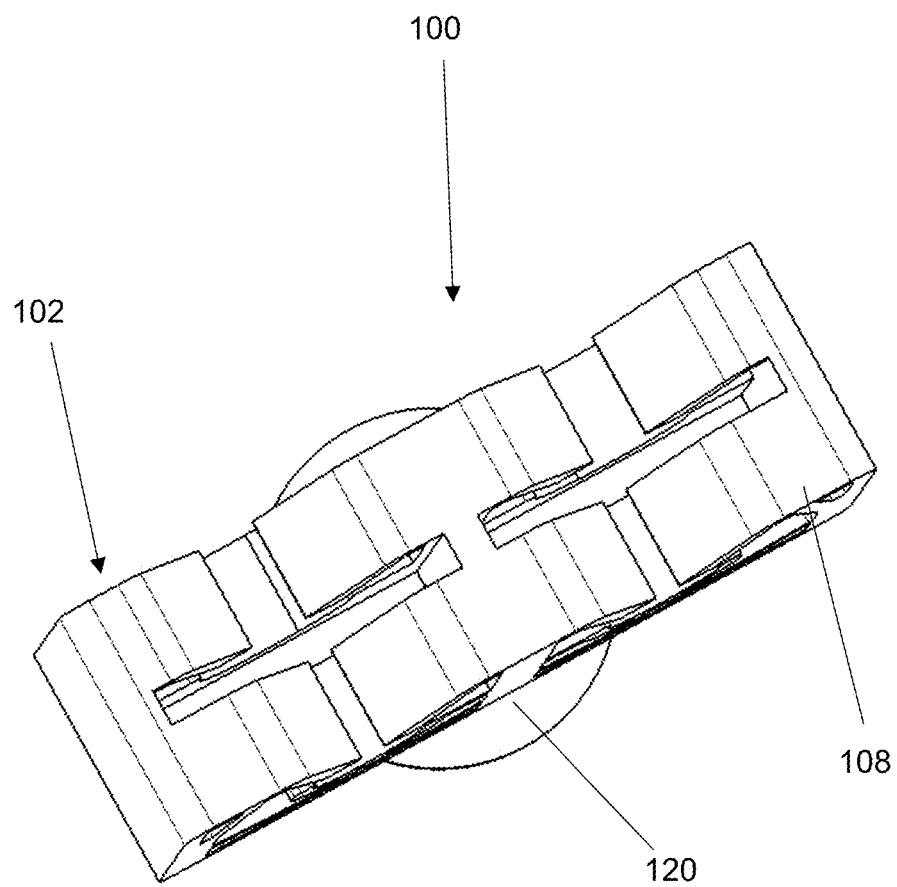
FIG. 1D illustrates top view of a multi-component clamp, in accordance with an example of the present subject matter.

FIG. 1A illustrates a perspective view of a multi-component clamp 100, according to one example of the present subject matter. FIG. 1B illustrates a cross-section view of a multi-component clamp. FIG. 1C illustrates a back view of a multi-component clamp. FIG. 1D illustrates top view of a multi-component clamp. The multi-component clamp 100 has a body 102 which further includes a set of lateral walls 104, a top wall 106 and a bottom wall 108. The multi-component clamp 100 further includes of a flexible holder 110 that has a receptacle 112 having a first end 114 and a second end 116. The first end 114 of the receptacle 112 is attached to the body 102 of the multi-component clamp 100 and the second end 116 of the receptacle 112 is kept free. In other words, the receptacle may be structured as a cantilevered beam. Accordingly, when a component is to be received in the receptacle 112, the second end 116 of the receptacle 112 flexes in an outward direction to provide flexibility to the receptacle 112 such that component of various sizes can be accommodated in the multi-component clamp 100. Therefore, the flexibility of the receptacle 112 increases which results in insertion force required to insert a component inside the flexible holder 110 to decrease significantly. Further, as a result of increase in flexibility, the receptacle 112 can easily accommodate different components of varied size with the required thrust force to move different components reducing significantly. Accordingly, the structure of the multi-component clamp 100 allows different components to be inserted in the receptacle 112 by applying less force and the inserted component can slide along the receptacle 112 by applying less thrust force.

The multi-component clamp 100 further includes a floating member 118 which supports a portion of the receptacle 112 between the first end 114 and the second end 116. The floating member 118 is designed in a manner such that the floating member 118 can flex along its length. In another aspect of the present subject matter, a bottom part of the receptacle 112 is connected to the floating member 118. In one example, the floating member 118 may be connected to the lateral walls 104 of the body 102 of the multi-component clamp 100. Therefore, when a component is being inserted in the receptacle 112, the floating member 118 allows the movement of the receptacle 112 in the direction of the insertion of the component. Accordingly, the floating member 118 provides increased flexibility to the receptacle 112 and as a result, force required to insert components in the receptacle 112 decreases.

The multi-component clamp 100 includes an anchor clamp 120 which secures the multi-component clamp 100 onto a mother component (not shown). Further, the multi-component clamp 100 includes one or more flexible holder retainer 122 placed adjacent to the first end 114 and the second end 116 of the receptacle 112. The flexible holder retainers 122 hold a component that is to be accommodated in the receptacle 112 in a secure manner. The flexible holder retainers 122 enhance the performance of the multi-component clamp 100 by increasing force required to extract, i.e., separation force, a component from the multi-component clamp 100.

The multi-component clamp 100 further includes a fixed holder 124 placed adjacent to the flexible holder 110. In one example, the fixed holder 124 is positioned parallel to the flexible holder 110. The fixed holder 124 further includes a fixed receptacle 126 having a first end 128 and a second end 130 both attached to the body 102. As the name indicates, the fixed receptacle 126 has both the ends, the first end 128 and the second end 130, fixed to the body 102 such that the ends 128 and 130 are immovable. The body 102 of the multi-component clamp 100 further includes one or more fixed holder retainers 132 adjacent to the first end 128 and the second end 130 of the fixed receptacle 126.

In one example, point of contact between the first end 114 of the receptacle 112 and the body 102 may further include a cut-out feature (not shown). The cut-out feature enhances the flexibility of the receptacle 112, resulting in lesser insertion force and thrust force.

Figure 2A:
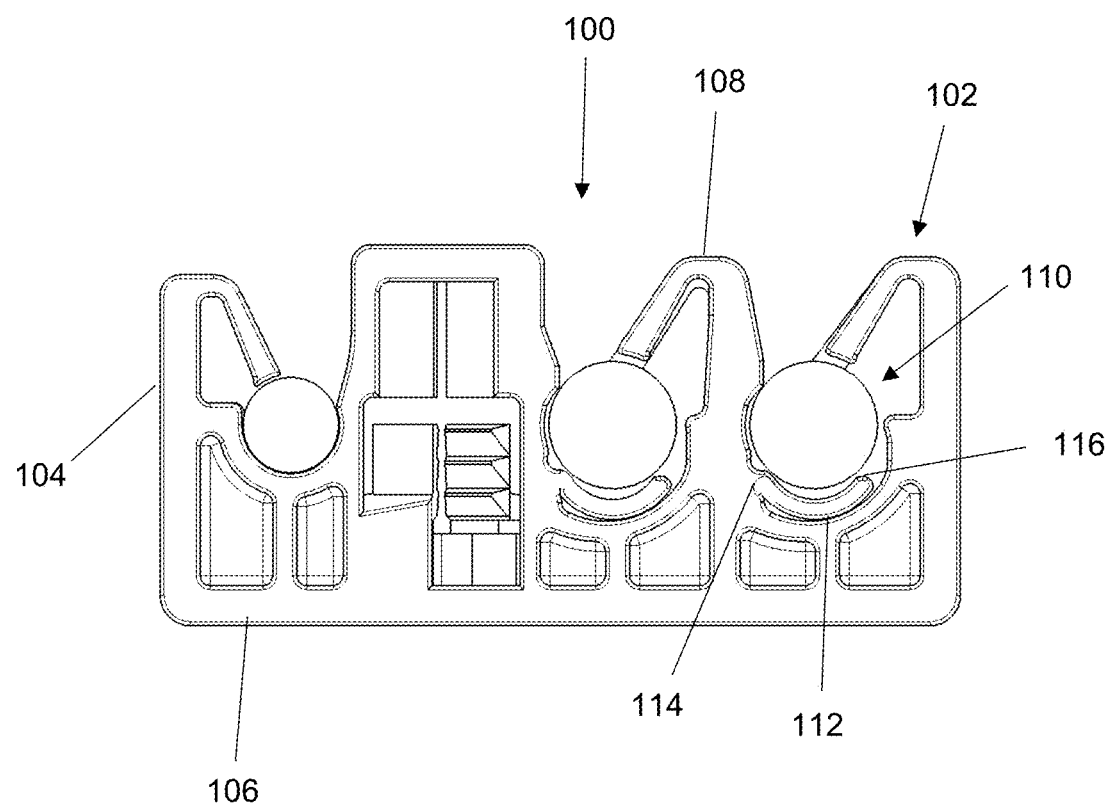
FIG. 2A illustrates a perspective view of a multi-component clamp, in accordance with another example of the present subject matter.

FIG. 2A illustrates a perspective view of a multi-component clamp 100, according to another example of the present subject matter. The multi-component clamp 100 includes a body 102. The body 102 of the multi-component clamp 100 includes a set of lateral walls 104, a top wall 106 and a bottom wall 108. The multi-component clamp 100 further includes a flexible holder 110 having a receptacle 112. The receptacle has a first end 114 and a second end 116, where the first end 114 of the receptacle 112 is attached to the body 102 of the multi-component clamp 100 and the second end 116 of the receptacle 112 is kept free.

Figure 2B:
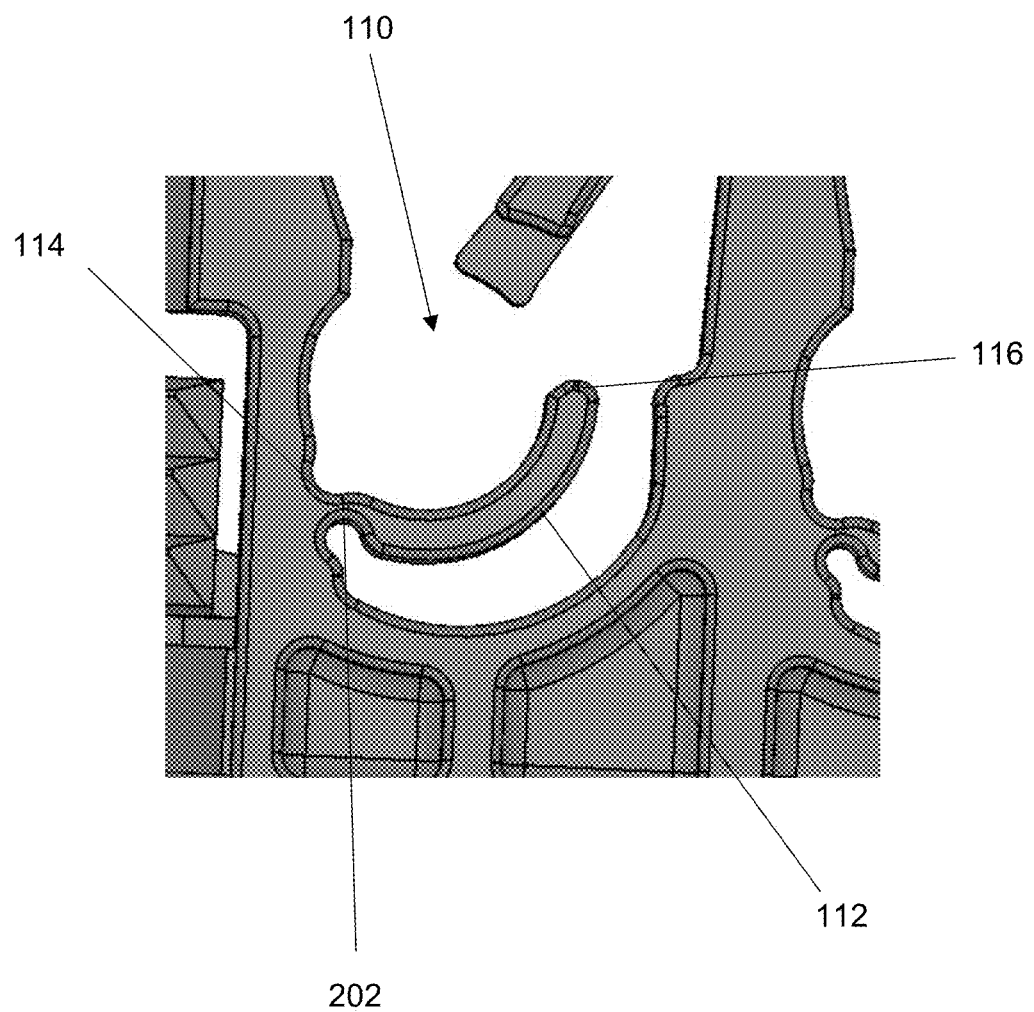
FIG. 2B illustrates a receptacle and a cut-out feature for a multi-component clamp, in accordance with another example of the present subject matter.

FIG. 2B illustrates a receptacle and a cut-out feature for a multi-component clamp. At a point of contact between the first end 114 of the receptacle 112 and the body 102, a cut-out feature 202 is included. When the receptacle 112 receives a component, the cut-out feature 202 allows the receptacle 112 to flex in a direction of insertion of component and in an outward direction of the second end 116 of the receptacle 112. The cut-out feature 202 thus adds to the flexibility of the receptacle 112, resulting in lesser insertion force and thrust force. In one example, the cut-out feature is of round shape or a C-shape. The receptacle 112 thus can accommodate components of various sizes. Accordingly, as the flexibility of the receptacle 112 increases which results in insertion force required to insert a component inside the flexible holder 110 to decrease significantly. Further, as a result of increase in flexibility, the receptacle 112 can easily accommodate different components of varied size and thrust force required to move different components along the receptacle reduces significantly. Accordingly, the structure of the multi-component clamp 100 allows different components to be inserted in the receptacle 112 by applying less force and the inserted component can slide along the receptacle 112 by applying less thrust force.

The multi-component clamp 100 may further include an anchor clamp (not sown) for securing the multi-component clamp 100 onto a mother component (not shown). Further, the multi-component clamp 100 may include one or more flexible holder retainer 122 placed adjacent to the second end 116 of the receptacle 112. The flexible holder retainers 122 hold a component that is to be accommodated in the receptacle 112 in a secure manner and also enhances the performance of the multi-component clamp 100 by increasing force required to extract, i.e., separation force, a component from the multi-component clamp 100.

The multi-component clamp 100 further includes a fixed holder 124 placed adjacent to the flexible holder 110. In one example, the fixed holder 124 is positioned to be parallel to the flexible holder 110. The fixed holder 124 has a fixed receptacle 126 having a first end 128 and a second end 130 both attached to the body 102. As the name indicates, the fixed receptacle 126 has both the ends, the first end 128 and the second end 130, fixed to the body 102 such that the ends 128 and 130 are immovable. The body 102 of the multi-component clamp 100 further includes one or more fixed holder retainers 132 adjacent to the first end 128 and the second end 130 of the fixed receptacle 126.

In one aspect of the present subject matter, component size having a diameter of at least 4.76 mm and at most 6.35 mm can be accommodated in the receptacle 112.

In one aspect of the invention, the multi-component clamp is designed in a manner such that a separation force of about 200 Newtons is required to extract a component out from the multi-component clamp 100. Further, the multi-component clamp is designed in a manner such that an insertion force of less than about 70 Newtons is required to accommodate a component into the receptacle 112.

In one aspect of the invention, the flexible holder is designed in a manner such that a thrust force of about 5 Newtons is required to slide a component in the receptacle 112.

We claim:

1. A multi-component clamp comprising:
 a body comprising first and second parallel lateral walls, a top wall, and a bottom wall, the body further including:
  a flexible holder disposed along a front side of the body, the flexible holder defining a flexible receptacle between a first end and a second end of the flexible holder, the flexible receptacle including a first surface opposite a second surface;
  a fixed holder disposed along a rear side of the body, the fixed holder disposed adjacent to the flexible holder between the first and second lateral walls, the fixed holder defining a fixed receptacle having opposing ends that each extend from the first and second lateral walls;
  a floating member extending from the second surface of the flexible receptacle and between the first and second lateral walls, the floating member being vertically spaced apart from the bottom wall by a gap along a length of the lateral walls, wherein the floating member is not directly connected to the bottom wall and is configured to allow the movement of the receptacle toward and away from the top wall, and
  wherein the floating member includes at least two inflection points.

2. The multi-component clamp as claimed in claim 1, wherein the floating member is capable of flexing along a length thereof.

3. The multi-component clamp as claimed in claim 1, wherein a bottom of the receptacle is coupled to the floating member.

4. The multi-component clamp as claimed in claim 1, further comprising an anchor clamp that extends from the top wall to mount the multi-component clamp onto a mother component.

5. The multi-component clamp as claimed in claim 1, comprising a first flexible holder retainer adjacent to the first end and a second flexible holder retainer adjacent to the second end of the receptacle.

6. The multi-component clamp as claimed in claim 1, wherein the floating member includes at least three inflection points.

7. The multi-component clamp as claimed in claim 1, wherein the flexible holder is configured to hold a first component of a first diameter of at least 4.76 millimeters and wherein the fixed holder is configured to hold a second component of a second diameter of at most 6.35 millimeters.

8. The multi-component clamp as claimed in claim 1, wherein the body comprises a first fixed holder retainer adjacent to the first flexible holder retainer.

9. The multi-component clamp as claimed in claim 1, wherein the multi-component clamp is configured for a separation force of 200 Newtons or more and an insertion force of 70 Newtons or less.

10. The multi-component clamp as claimed in claim 1, wherein the flexible holder is configured for a thrust force of 5 Newtons or more.

11. A multi-component clamp, comprising:
- a body comprising a first and second lateral walls, a top wall, and a bottom wall, the body further including:
  - a flexible holder disposed along a front side of the body, the flexible holder defining comprising a flexible receptacle between a first end and a second end of the flexible holder, the flexible receptacle including a first surface opposite a second surface;
  - a fixed holder disposed along a rear side of the body, the fixed holder disposed adjacent to the flexible holder between the first and second lateral walls, the fixed holder defining a fixed receptacle having opposing ends that each extend from the first and second lateral walls;
  - a floating member extending from the second surface and between the first and second lateral walls, wherein the floating member is disposed above the bottom wall and is spaced apart from the bottom wall by a gap such that the floating member is not in direct contact with the bottom wall, and
- wherein an anchor clamp extends outward from the top wall and opposite to the direction of the bottom wall.

12. The multi-component clamp as claimed in claim 11, wherein the flexible receptacle is configured to receive components of various sizes inserted from the direction of the bottom wall toward the top wall.

13. The multi-component clamp as claimed in claim 12, wherein the flexible receptacle is configured to move toward and away from the top wall.

14. The multi-component clamp as claimed in claim 11, wherein the fixed receptacle is immovable relative to the flexible receptacle.

15. A multi-component clamp comprising:
- a body comprising a first and second parallel lateral walls, a top wall, and a bottom wall, the body further including:
  - a plurality of flexible holder retainers, at least one of the plurality of flexible holder retainers extending from a corner defined by at least one of the first and second lateral walls and the bottom wall toward the top wall;
  - a flexible holder disposed along a front side of the body, the flexible holder defining a first receptacle between a first end and a second end of the flexible holder, the first receptacle having a first surface and a second surface opposite the first surface, a thickness is defined between the first and second surfaces;
  - a floating member extending from the second surface and between the first and second lateral walls, the floating member being vertically spaced apart from the bottom wall by a gap along a length of the lateral walls;
  - a fixed holder disposed along a rear side of the body, the fixed holder defining a second receptacle having opposing ends that each extend from the first and second lateral walls; and
  - a plurality of fixed holder retainers, wherein the first receptacle of the flexible holder and the second receptacle of the fixed holder, in combination, are configured to receive a component,
- wherein the plurality of flexible holder retainers and the plurality of fixed holder retainers are spaced laterally apert by a gap,
- wherein the first end of the first receptacle is attached to the body and the second end of the first receptacle is free such that the receptacle is configured to flexibly accommodate the component, and the first receptacle is configured to move in a direction toward and away from the top wall, and
- wherein the first end includes a cut-out feature with a thickness that is smaller than the thickness between the first and second surfaces.

16. The multi-component clamp as claimed in claim 15, further comprising an anchor clamp that extends between the top wall and the bottom wall to mount the multi-component clamp onto a mother component.

17. The multi-component clamp as claimed in claim 16, wherein the anchor clamp is positioned between the first receptacle and the second receptacle.

18. The multi-component clamp as claimed in claim 15, wherein the flexible holder is configured to hold a first component of a first diameter of at least 4.76 millimeters and wherein the fixed holder is configured to hold a second component of a second diameter of at most 6.35 millimeters.

* * * * *